Nov. 6, 1956
C. F. SCHWAN
2,769,953
FIELD COIL BALANCING ARRANGEMENT
Filed July 27, 1951
2 Sheets-Sheet 1
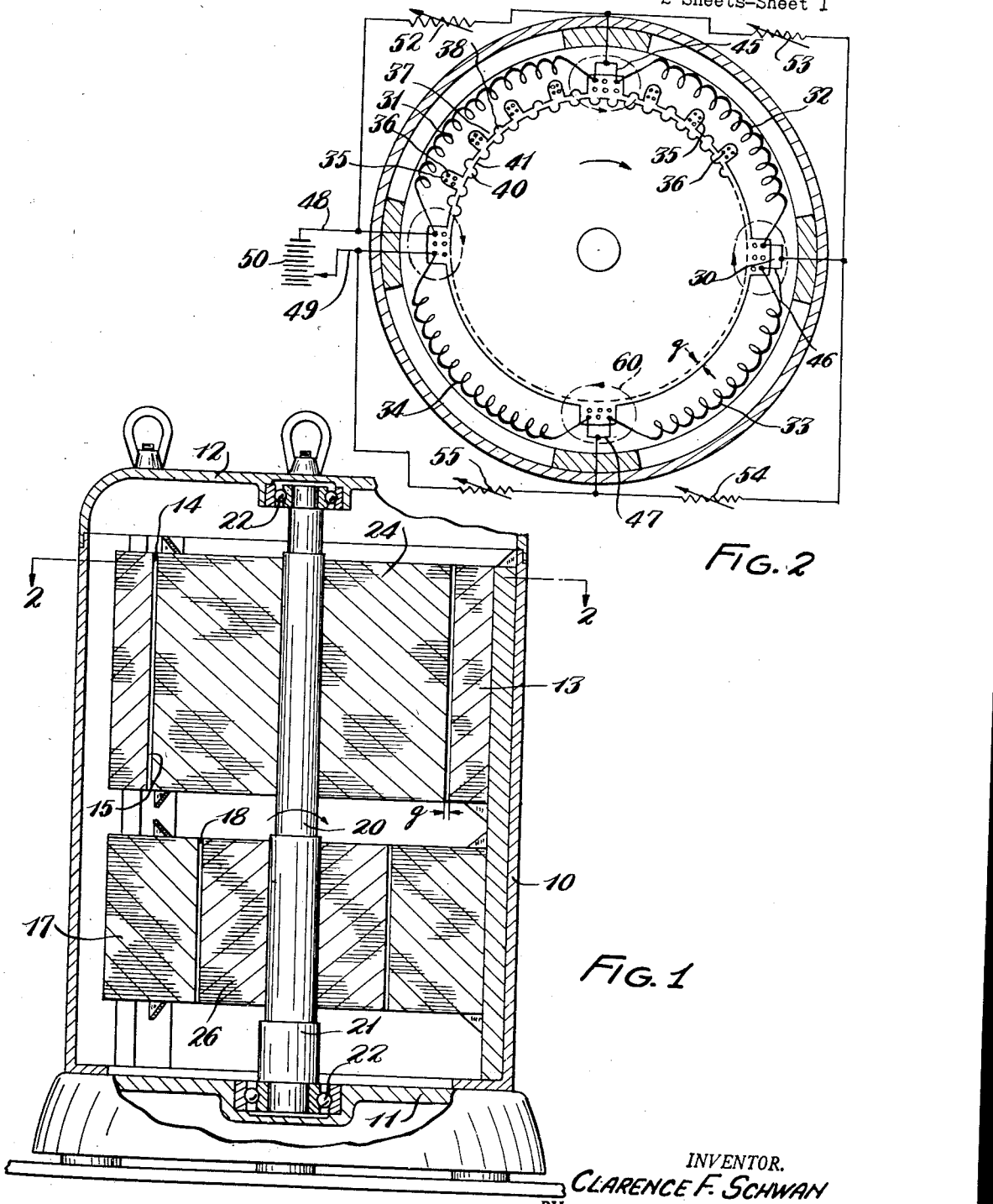
INVENTOR.
CLARENCE F. SCHWAN
BY
Alfred C. Body
ATTORNEY Nov. 6, 1956

C. F. SCHWAN 2,769,953

FIELD COIL BALANCING ARRANGEMENT

Filed July 27, 1951

INVENTOR.
CLARENCE F. SCHWAN
BY
*Alfred C. Body*
ATTORNEY

United States Patent Office 2,769,953
Patented Nov. 6, 1956

2,769,953
FIELD COIL BALANCING ARRANGEMENT

Clarence F. Schwan, Cleveland, Ohio, assignor to The Ohio Crankshaft Company, Cleveland, Ohio, a corporation of Ohio Application July 27, 1951, Serial No. 238,877

14 Claims. (Cl. 322—58)

This invention pertains to the art of electric motors and generators and, more particularly, to electric motors or generators having D. C. energized field coils.

The invention is particularly adapted for use in high-frequency motor generators of the inductor-alternator type and will be described with particular reference to such equipment, although it will be appreciated that the invention has broader applications and is equally applicable to other types of rotating electrical equipment.

Briefly, inductor alternators include a fixed stator member and a driven motor member rotating within the stator member with a small air gap therebetween. Field coils, usually four, and armature coils are mounted in slots of the stator. The field coils are energized from a D. C. voltage source and the flux created thereby threads in a loop through the armature coils, across the air gap, and into the rotor. The amount of flux is dependent on a number of factors, the width of the air gap and the strength of the current in the field coil being principal deciding factors.

High-frequency variations in the flux generate voltages in the armature coils.

This flux, while necessary to the prime functioning of the generator; i. e., the generation of electric power, also introduces problems into the successful operation of the generator with which problems the present invention is concerned. Generally, these problems are with unbalanced forces on the rotor.

The flux of each coil in the air gap exerts a physical force or pull on the metal of the rotor transverse to the axis of rotation. Normally, and in the perfect machine, the air gap is absolutely uniform and the coils are symmetrically positioned and uniformly wound and energized so that the pull of any one coil is exactly balanced and offset by the pull of its opposite coil. Any eccentricity of the air gap, however, will upset this balanced relationship.

Accordingly, equipment of this type requires both careful dynamic balancing of the rotor and careful positioning of the rotor in the stator opening. If the rotor is eccentrically positioned, the magnetic flux of the field coils will be unbalanced because of the effect of the air gap on the flux of each coil. As a result, the voltages generated in the various armature coils will not be uniform. If the armature coils are connected in parallel, as they often are, rather large currents will circulate in the windings resulting in a loss of efficiency. Also, the eccentric positioning unbalances the magnetic pull of the field coils on the rotor creating a rather large side thrust on the rotor which must be taken up by the rotor-supporting bearings. In inductor alternators, this problem is particularly aggravated because of the relatively small air gaps employed and the relatively large opposed areas of the rotor and stator.

If the rotor is unbalanced dynamically, the rotor shaft is deflected from its normal concentric position, resulting in another form of eccentricity. This eccentricity rotates at the speed of the rotor, creating an unbalanced magnetic force on the rotor which rotates with the rotor member. The effect is to lower the critical speed of the shaft, in some instances to below the desired rotational speed for the rotor. In inductor alternators where it is normally desired to rotate the rotor at approximately 3600 revolutions per minute, the problem of critical speed, particularly in large-sized generators, is of great concern.

In commercial practice, it is impracticable, and almost impossible, to obtain perfect dynamic balancing of the rotor or stator so that the problems referred to exist to a greater or lesser degree in all rotating electrical equipment.

The invention contemplates and has for its principal object means for overcoming all of the above referred to difficulties in a simple and expeditious manner.

In accordance with the invention, rotating electrical equipment, including a stator, a rotor and a plurality of separate field coils circumferentially spaced about the rotor and energized from a D. C. power source, is provided with: field coils so connected that the voltage across each field coil is independent of the other field coil or coils; means for adjusting the current in each coil relative to the currents in the other coil or coils so as to compensate for any eccentric positioning of the rotor relative to the stator; and with means for independently flowing an alternating current in each field coil of a magnitude and phase to offset and counteract the tendency of the air-gap fluxes to vary because of any rotating eccentricity in the gap between the rotor and stator caused by dynamic unbalance.

In embodiments of the invention, the field coils may be connected in electrical series relationship with a D. C. energizing power source. Alternatively, the coils may each have an adjustable isolating resistor in series therewith and the series resistors and coils may then all be connected in parallel relationship or separate D. C. sources may be used for each coil. With such arrangements, the voltage across each coil is independent of the voltage across any other coil; while, at the same time, the energizing current in all of the field coils may be simultaneously varied.

Each field coil has a variable resistor connected in shunt therewith having a nominal D. C. resistance value greater than that of the associated field coil. By adjusting the value of each of these resistors, greater or less portions of the field-coil energizing currents may be shunted through these resistors, thereby adjusting the current flowing in the particular coil relative to the other coils so that the magnetic forces of the field of each field coil on the rotor may be absolutely and equally balanced, notwithstanding any eccentric positioning of the rotor.

These shunting resistors also have an A. C. impedance which is very much less than the A. C. impedance of the field coil at a frequency in cycles per second numerically equal to the speed of rotation of the rotor in revolutions per second. I have found, as a result of the invention, that the rotating eccentricity due to dynamic unbalance generates an A. C. voltage in each field coil of a frequency numerically equal to the speed of rotation, this A. C. voltage being superimposed on the D. C. energizing voltage across each coil. This voltage generates an alternating current in the closed circuit formed by the field coil and the shunting resistor, which current, superimposed on the D. C. current, generates an alternating flux in each field coil which is of a magnitude and phase such as to almost entirely compensate for the tendency of the air gap or field-coil fluxes to vary because of dynamic unbalance of the rotor. This equalizes the magnetic forces on the rotor and, therefore, the critical speed of the shaft is not affected. Alternately, a separate A. C. power source for each field coil could be provided.

An object of the invention is the provision in rotating electrical equipment having a plurality of D. C. energized field coils of new and improved means for overcoming the effect of rotor unbalance on the critical speed which comprises flowing an alternating current in each field coil of a frequency equal to the speed of rotation of the rotor and of magnitude and phase such as to hold the air-gap flux constant, notwithstanding eccentricity of the air gap caused by dynamic unbalance of the rotor.

Another object of the invention is the provision of new and improved equipment of the type referred to having means for adjusting the magnetic pull of each field coil on the rotor after the rotor has been finally assembled with the stator so as to counteract the effect of any unintended static eccentricities of the rotor relative to the stator.

Sill another object of the invention is the provision of new and improved equipment of the type referred to having its field coils so connected that voltages may be generated thereacross independently of the voltages in the other field coils, each field coil having a resistor in shunt therewith which has an alternating-current impedance at the speed of rotation of the rotor much less than the alternating-current impedance of the field coil at that frequency.

Another object of the invention is the provision of rotating electrical equipment having a plurality of field coils connected in electrical series relationship in combination with means for independently adjusting the energizing current in each field coil relative to the other field coil or coils.

Still another object of the invention is the provision in rotating electrical equipment having a plurality of field coils of new and improved means for offsetting the effects of air-gap eccentricity, including independently connected field coils, and a variable resistance in shunt with each field coil having a D. C. resistance greater than and an alternating-current resistance much less than the corresponding resistances and impedances of the field coil.

The invention will be specifically set forth and defined in the claims appended hereto. As a means of illustrating and further describing the invention, preferred embodiments will be described in detail in this specification and illustrated in the attached drawings which are a part hereof, and wherein:

Figure 1 is a side cross-sectional view of a high-frequency, motor-generator unit of the inductor-alternator type embodying the present invention;

Figure 2 is a top cross-sectional view of Figure 1 taken approximately on the line 2—2 thereof;

Figure 3:
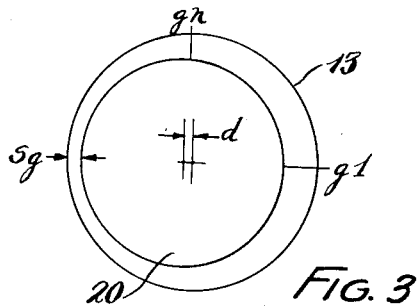
Figure 3 is a view, for the purposes of further describing the invention, of an eccentrically positioned rotor and stator member with the eccentricity greatly exaggerated for the purposes of clarity.

Referring now to the drawings wherein the showings are for the purposes of illustration only, Figures 1 and 2 show, somewhat schematically, cross-sectional views of a high-frequency motor generator of the inductor-alternator type, including a housing 10 generally cylindrical in shape and having a base 11 and a top member 12. A generator-stator member 13 is mounted on the upper part of the housing and has an interior cylindrical opening defined by a cylindrical surface 15 coaxial with the housing 10. A motor-stator member 17 is mounted in the lower part of the housing 10 and has a cylindrical opening 18 coaxial with the housing and the generator-stator opening 14.

A rotor member shown generally at 20 extends the length of the housing 10 and rotates on the axis of the housing and the stator members. The rotor 20 includes a shaft 21 journalled at its ends in the base 11 and the top 12. The bearings journalling the shaft form no part of the present invention and, accordingly, are shown schematically. The rotor 20 also includes a stack of magnetic laminations 24 coextensive with the generator-stator member 13 and a stack of laminations 26 coextensive with the motor-stator member 17. The motor-stator and motor-stator rotor laminations may be formed in any conventional manner and will not be described further except to say that, in the preferred embodiment, the motor operates at a speed approximately 3600 revolutions per minute.

The generator stator is comprised of a stack of relatively thin magnetic laminations punched out to the desired shape. This stack of laminations is, preferably, clamped by any suitable means and may also be artificially cooled if desired.

The generator stator 13 has four axially extending field-coil slots 30 formed on its inner surface 15, these slots being equally spaced at the four cardinal points around the stator. Four field coils 31, 32, 33, 34 are disposed in the field-coil slots 30, each slot, as shown, containing sides of adjacent field coils. Obviously, there may be more or less field coils than that shown. The surface 15 of the generator stator 13 intermediate the field-coil slots 30 is provided with a plurality of axially extending armature-coil slots 35 in which armature windings 36 are disposed. As shown, these armature-coil slots form stator teeth or armature poles 37 which, in turn, have shallow slots 38 in the face thereof. The number of rotor teeth 41 will determine, in conjunction with the speed of the generator rotor 20, the frequency of the power output of the generator. The number of armature turns 36 in the armature slots 35 and how they are connected electrically will determine the output voltage of the generator. Obviously, these armature windings may be connected in series or parallel to obtain the desired output voltages and/or currents of the generator.

The generator rotor 24 is provided on its external surface with a plurality of generally axially extending alternate rotor slots 40 and rotor teeth 41, the circumferential width of the teeth 41 being approximately one half the width of the slots 40. The width of the slots 40 is approximately the width of the armature-pole slots 38 but they have a lesser pitch.

Figure 4:
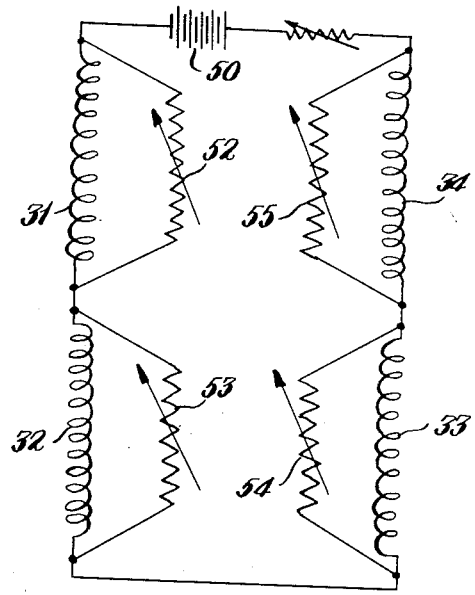
Figure 4 is a schematic wiring diagram of the field coils, shunting resistors and energizing source for the field coils of Figure 2.
Figure 6:
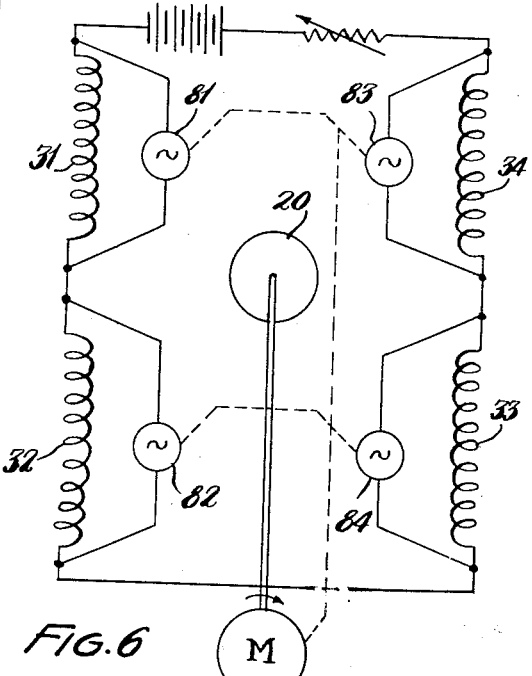
Figure 6 is a view similar to Figure 4, but showing a still further alternative embodiment of the invention.

In the embodiment of the invention shown in Figures 2, 4 and 6, the field coils 31, 32, 33, 34 are all connected in electrical series relationship. Thus, conductor 45 connects adjacent terminals of the field coils 31 and 32; conductor 46 connects adjacent terminals of the coils 32 and 33; and conductor 47 connects adjacent terminals of the field coils 33 and 34. The adjacent terminals of coils 31 and 32 are connected through wires 48 and 49 respectively to a source of D. C. energizing potential 50 shown schematically as a battery. Obviously, other means or direct-current energizing potential could be employed such as a generator or rectified alternating current. The wire 49 is shown as adjustably tapped onto the battery 50 so that the energizing potential and, thus, the current flowing in the field coils may be readily and simultaneously adjusted. Obviously, a resistor or any other adjusting means could be employed.

Further, and in accordance with the invention, resistors are connected in shunt or parallel with each field coil. Thus, a resistor 52 is connected in shunt with the field coil 31; a resistor 53 is in shunt with the field coil 32; a resistor 54 is in shunt with the field coil 33; and a resistor 55 is in shunt with the field coil 34. These resistors serve a very important function as will be detailed hereinafter. As shown, the resistors 52, 53, 54, 55 are all of the fixedly-adjustable type and are, preferably, noninductive.

The electrical characteristics of the resistors in relation to the electrical characteristics of the field-coil windings are also important to proper functioning of the invention. Thus, it is desirable that each resistor have a D. C. resistance greater than the D. C. resistance of its respective field coil but that it have an alternating-current impedance very much less than the alternating-current impedance of the respective field coil at a frequency equal numerically to the speed of rotation of the rotor in revolutions per second.

In a practical embodiment of the invention constructed by applicant for generating 3000 cycle per second energy, the field coils had a D. C. resistance of 2 ohms and a 60 cycle A. C. impedance of 1800 ohms. The resistors had a value of 25 ohms or approximately twenty times that of the D. C. resistance of the field coil. Obviously, different ratios could be employed. The resistors also are, preferably, of the noninductive type.

The rotor 20, after assembly with the motor and generator stator 26, 24 respectively, is placed in a conventional dynamic balancing machine and balanced as carefully as possible. After balancing, the rotor is assembled with the stator members and positioned as nearly concentrically in the stator opening as is possible so that the gap g will be uniform over the entire periphery of the generator stator and rotor.

In operation, the field coils 31, 32, 33, 34 are energized from the D. C. source 50. Current in the field coils tends to generate a magnetic flux, the value of which, for any given set of field coils at any given energization, depends on the permeance of the magnetic circuit through which the flux lines flow. In the embodiment of the invention shown, the flux lines flow in loops as indicated by the dotted lines and arrows 60 of Figure 2. The maximum permeance of the magnetic circuit is determined by the air gap between the rotor and stator when the stator and rotor teeth are aligned. The minimum permeance is determined by the effective air gap when the teeth are out of alignment.

High-frequency voltages are generated in the armature coils by alternately increasing and decreasing the permeance of the air gap at a frequency equal to the frequency of the desired output of the generator. Thus, as the rotor 24 rotates, the teeth 41 thereof alternately come in registration with the teeth 37 of the stator and then the slots 35. When any one tooth of the stator and rotor are in registration, the permeance of the air gap at that point is a minimum. When the teeth are out of registration, the effective air gap is increased many times and the permeance of the magnetic circuit is likewise increased. This change in permeance varies the flux through the armature poles and coils which, in turn, generates a high-frequency voltage in the armature coil. In the usual machine at any one time, there are some teeth on the rotor in registration with teeth on the stator and some teeth which are out of registration so that the average air-gap permeance for the poles is generally a constant.

As the high-frequency power in the armature coils is generated by a variation in the effective air gap, it will be seen that the gap dimensions are important to the operation of the inductor alternator. For the optimum performance, the minimum gap around the rotor should be absolutely uniform. However, such an optimum condition is almost impossible to secure in a commercially practicable machine. For example, .005 inch error in aligning the rotor with the stator would be for a 3-foot diameter rotor, an error of one part in 7,000. However, for an air gap of .050 inch, this eccentricity would be approximately 10 percent.

Eccentricity of the rotor relative to the stator; i. e., an air gap which is not uniform, may be produced by unintentional inaccurate positioning of the rotor relative to the stator or by some eccentricity of the surfaces of the rotor relative to its axis of rotation caused by dynamic unbalance in the shaft or a bent shaft.

The effect of either cause of eccentricity is shown in exaggerated form in Figure 3 where the gap is varied from its normal uniform dimension $g_n$ by an amount $d$ resulting in a large gap $g_l$ and a small gap $g_s$, the latter two differing by an amount equal to $2 \times d$.

Assuming a uniform energizing current and magneto- motive force for all of the field coils, the flux in the small gap and in the field coil opposite this gap will be greater than the flux in the large gap $g_s$ and in the field coil opposite this gap. The two flux fields, being unequal, will exert an unbalanced physical magnetic pull on the rotor.

The difference between the eccentricities is that with the eccentricity caused by dynamic unbalance or a bent shaft, the eccentricity rotates relative to the stator at the speed of the rotor while, with eccentric positioning, the eccentricity remains stationary relative to the stator. The effect of the latter is to produce a fixed lateral force on the rotor which, if sufficiently large, can overload the rotor-supporting bearings. Additionally, the maximum flux in the armature coil opposite the small gap will be greater than the maximum flux in the armature coils opposite the large gap. The high-frequency voltage induced in the armature coils opposite the small gap will, thus, be greater than the voltages induced in the armature coils opposite the large gap. If these coils are connected in parallel relationship, the difference in voltages induced in the different armature coils would create internal circulating currents in the coils which would produce a loss in efficiency.

With the field coils connected as shown in the preferred embodiment, the magneto-motive force in each field coil may be adjusted relative to the other field coils by adjusting the respective shunting resistors. Thus, if the small gap were opposite the field coil 31, decreasing the amount of resistance in the resistor 52 would decrease the current flowing in the field coil 31, thereby decreasing its magneto-motive force so that the flux in the small gap would be reduced to an amount equal to the flux in the large gap; which, in this case, would be opposite the field coil 33. In a like manner, if the resistance of the resistor 54 were increased in value, greater amounts of energizing currents would flow in the field coil 33, increasing its magneto-motive force to overcome the effects of the greater permeance of the large gap. With the arrangement shown, the resistors 52, 53, 54, 55 may be adjusted after assembly of the rotor with the stator so that the magnetic flux in the air gap will be uniform all around, notwithstanding the fact that the air gap itself may have some eccentricity due to improper positioning of the rotor relative to the stator.

When the eccentricity is caused by dynamic unbalance of the rotor or a bent shaft, the resultant unbalanced magnetic forces on the rotor will lower the critical speed of the rotor sometimes below the desired speed of operation. The shunting resistors 52, 53, 54, 55 prevent or limit to safe values this unbalanced magnetic force.

In actual operation, the gap opposite any one coil will increase and decrease at a frequency equal to the speed of rotation of the rotor. From the standpoint of any one field coil, the permeance of its magnetic circuit will, therefore, constantly increase and decrease. As the flux is proportional to permeance, the flux through the field coils will rapidly vary and will generate a voltage in the field coils which will appear superimposed on the D. C. voltage across the field-coil terminals. The phase of the voltages induced in each coil is such that with the series connection shown, the sum of the voltages in the four coils will equal zero and no A. C. voltage will appear across the wires 48, 49. The A. C. voltage generated across the terminals of each field coil creates an alternating-current flow through the coil and the respective shunting resistor. This current in the field coil is superimposed on the D. C. energizing current and will increase and decrease the magneto-motive force of the coil at a frequency equal to the speed of the rotor. This change in magneto-motive force in each field coil will be 180 degrees out of phase with the conditions that created it. Thus, the increase in magneto-motive force in one coil caused by the passage of the small gap will reach a maximum at the time that the large gap has rotated through 180 degrees and is then opposite that coil. The effect of the increase in the magneto-motive force is to offset and counteract the tendency of the flux to decrease because of the presence of the large gap. In a like manner, the passage of the large gap opposite any one point on the stator creates a lessened magnetomotive force at that point at a time when the small gap has rotated through 180 degrees and is opposite that point.

The effect of this resistor in shunt with the field coil is almost the same as though each field coil were provided with a short-circuited turn of relatively large cross-section copper, this short-circuited turn serving as a damping means to balance out the undesirable effects referred to above.

It will be appreciated that the power factor of the currents flowing in the field coil and shunting resistor will be practically zero and lagging relative to the generating voltage, that is to say, the currents will be 90 degrees lagging to the generating voltage. However, the generating voltage will, in turn, be 90 degrees lagging to the flux through the coil, i. e., the increase of flux, due to the rotating small air gap and, thus, the flux generated or the magneto-motive force will lag by substantially 180 degrees the rotating small air gap, that is to say, the increase of flux of any one field coil will occur at exactly the same time that the large air gap has reached the point of that field coil.

While it is impossible to make the resistors have a resistance value of zero, I have found that it is sufficient for the purposes of the invention if the resistances have a value substantially less than the alternating-current impedance of the field coil at a frequency equal numerically to the speed of rotation of the rotor.

If the resistors 52, 53, 54, 55 were not employed, the effect of the unbalanced magnetic forces on the rotor caused by the dynamic unbalance would be to lower the critical speed of the shaft; but with the resistors shown serving as a damping circuit across each field coil, the resultant effect is to balance the magnetic field so that dynamic unbalance of the shaft will have no effect on its critical speed.

It will thus be seen that an embodiment of the invention has been described wherein rotating electrical equipment having a plurality of separate D. C. energized field coils is provided with connections for the field coils so that voltages may be developed across each field coil independently of the other field coils, the field coils being provided with means for adjusting the energizing currents flowing therethrough so that the effect of static eccentricity of the rotor relative to the stator can be readily adjusted out and means are provided for generating an alternating-current flow in each field coil of a magnitude and phase so as to counteract the effect of any unbalanced magnetic forces on the rotor caused by dynamic unbalancing of the rotor.

Figure 5:
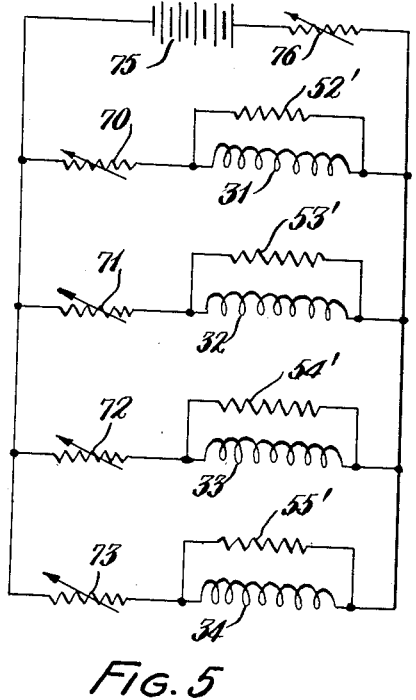
Figure 5 is a view similar to Figure 4 showing an alternative embodiment of the invention.

The invention may obviously be embodied in other forms. For example, Figure 5 shows a schematic circuit of an alternative embodiment. In this figure, there are four field coils 31, 32, 33, 34, each field coil having a resistor 52', 53', 54', 55' connected in parallel therewith. These resistors are of the nonadjustable type and perform the function of damping out the variations in the air-gap flux caused by dynamic unbalance. The shunt circuit formed by each resistor and its respective field coil is connected in series with an adjustable resistor 70 of relatively high value. In a like manner, the shunt resistor 53 and coil 32 have a resistor 71 in series therewith. The resistor 54 and coil 33 have a resistor 72 connected therewith and the resistor 55 and coil 35 have a resistor 73 in series therewith. These series parallel circuits are connected in parallel across a D. C. energizing source 75 through a series adjustable resistor 76. The resistors 70, 71, 72, 73 serve as isolating resistors, enabling voltages to be developed across the terminals of each field coil which will be unaffected by the voltages developed across the terminals of any other field coils so that the voltages developed can flow through the respective resistors and counteract the effects of any dynamic unbalance of the rotor 20.

Resistors 70, 71, 72, 73 may be relatively adjusted so as to control the magneto-motive force of each field coil and adjust for the effects of any static eccentric positioning of the rotor relative to the stator.

Figure 6 shows another alternative embodiment of the invention. In this embodiment, the field coils 31, 32, 33, 34 are all connected in electrical series. Small A. C. generators 81, 82, 83, 84 have their output terminals connected across the terminals of field coils 31, 32, 33, 34 respectively. These A. C. generators are preferably driven synchronously with the rotor. The output voltage and phasing of these generators is adjusted to flow a current through each field coil of a magnitude and phase to offset the effect of the dynamic unbalance of the rotor 20.

It will be appreciated that other embodiments of the invention wil occur to others upon a reading and understanding of this specification. It is my intention to include all such modifications and alterations insofar as they come within the scope of the appended claims.

Having thus described my invention, I claim:

1. Rotating electrical equipment, including a stator, a rotor rotatably supported relative to the stator and in operative relationship therewith, a plurality of field coils positioned about said rotor, D. C. means for energizing said coils, said coils being so connected that voltages may be developed thereacross independently of the voltages across any other coil, means for adjusting the energizing current in each field coil relative to the other field coil or coils and other means for flowing an alternating current in said coils superimposed on the D. C. current of a magnitude and phase such as to offset the tendency of the flux of any one coil to vary due to dynamic unbalance of the rotor.

2. Rotating electrical equipment comprising, in combination, a stator member, a rotor member supported for rotation in said stator member, means for rotating said rotor member at speeds in excess of 1400 revolutions per minute, a plurality of field coils on said stator member positioned about said rotor each having a determinable D. C. resistance and A. C. impedance, each coil being part of an electrical network, each network comprising said coil, a resistance in series with said coil and a second resistance in parallel with said coil, and means connecting said networks in parallel with a D. C. energizing source.

3. Rotating electrical equipment comprising, in combination, a stator member, a rotor member supported for rotation in said stator member, means for rotating said rotor member at speeds in excess of 1400 revolutions per minute, a plurality of field coils on said stator member positioned about said rotor, means for energizing said field coils with a D. C. energizing current, an A. C. power source for each coil having a frequency output equal numerically to the speed of rotation of said rotor shaft and means for adjusting the phase and magnitude of the output voltage of said power sources to maintain the flux in the air gap between said stator and rotor constant notwithstanding any dynamic unbalance of said shaft.

4. In rotating electrical equipment including armature coils connected to a load and a stator having a plurality of direct-current energized field coils electrically independent of said load positioned about a rotor in said stator, the improvement for compensating for dynamic unbalance of the rotor, which comprises, in combination with the field coils, of means for damping out alternating currents generated in said field coils by the rotation of said dynamically unbalanced rotor.

5. The combination of claim 7 wherein means are provided for simultaneously adjusting the energizing current in all of the field coils.

6. The combination of claim 8 including means for simultaneously varying the energization of all of said field coils at the same time.

7. In rotating electrical equipment, including a stator, a rotor rotatably supported relative to the stator and in operative relationship therewith, a plurality of armature coils adapted to be connected to a load, a plurality of field coils positioned about said stator and connected to an external power source, and means associated with each field coil for independently adjusting the energizing currents in each field coil relative to the other field coils.

8. In rotating electrical equipment, including a stator, a rotor rotatably supported relative to the stator and in operative relationship therewith, a plurality of field coils positioned about said rotor, means connecting all of said field coils in electrical series relationship with a remote D. C. power source, and an electrical resistor in parallel with each field coil.

9. Rotating electrical equipment including armature coils connected to a load, a stator having a plurality of circumferentially positioned field coils, a remote power source for energizing said field coils, and a rotor in operative relationship with said coils, the improvement for compensating for accidental or intentional eccentric positioning of the rotor relative to the stator which comprises means associated with each field coil for independently adjusting the energizing current thereof relative to the other field coils.

10. In rotating electrical equipment, including a stator, a rotor rotatably supported relative to the stator and in operative relationship therewith, a plurality of field coils positioned about said rotor and electrically independent of the load on said equipment, D. C. means for energizing said field coils and means for flowing an alternating current in said field coils of a magnitude and phase such as to offset the tendency of the field coil flux to vary caused by dynamic unbalance of the rotor.

11. In rotating electrical generating equipment to be connected to a load and including a rotor and a stator having a plurality of direct current energized field coils electrically independent of said load positioned about said rotor, the improvement for compensating for dynamic unbalance of said rotor which comprises the combination with the field coils of a resistor in shunt with each of the field coils, each having a D. C. resistance substantially greater than that of the D. C. resistance of the field coils and much less than the A. C. impedance of the field coils at the frequency of rotation of the rotor.

12. In rotating electrical generating apparatus including a rotor and a stator having a plurality of direct current energized field coils electrically independent of the load on the generator and positioned about said rotor, the improvement for compensating for dynamic unbalance of said rotor which comprises the combination with the field coils of a resistor in shunt with each of the field coils, each having a D. C. resistance substantially greater than the D. C. resistance of the field coils and much less than the A. C. impedance of the field coils at the frequency of rotation of the rotor, one or more of said resistors being adjustable and the field coils being connected in electrical series relationship and adapted to be connected to a D. C. energizing source whereby static eccentricity of the rotor relative to the stator may be compensated for.

13. In rotating electrical equipment, including a stator, a rotor rotatably supported relative to the stator and in operative relationship therewith, a plurality of armature coils connected to a load, a plurality of field coils positioned about said rotor and electrically independent of said load, means connecting said coils in series relationship, said coils having a predeterminable D. C. resistance and A. C. impedance at a frequency equal numerically to the speed of rotation of the rotor and a resistor in shunt with each field coil having a D. C. resistance greater than the D. C. resistance of the field coil and an A. C. impedance much less than the A. C. impedance of the field coil.

14. Rotating electrical equipment comprising a stator member, a rotor member supported for rotation in said stator member, means for rotating said rotor member at speeds at least in excess of 1400 revolutions per minute, a plurality of field coils on said stator member positioned about said rotor and electrically independent of the load on said equipment connected in electrical series relationship with a D. C. energizing source, said coils having a determinable D. C. resistance and A. C. impedance, a resistor connected in parallel with each field coil, each resistor having a D. C. resistance greater than the D. C. resistance of its respective field coil but much less than the A. C. impedance of said coils at frequencies in excess of 23 cycles per second.

References Cited in the file of this patent
UNITED STATES PATENTS

| | | |
|---|---|---|
| 594,489 | Prentiss | Nov. 30, 1897 |
| 1,376,400 | Chubb | May 3, 1921 |
| 2,385,199 | Fisher | Sept. 18, 1945 |